(12) United States Patent
Hanson

(10) Patent No.: US 8,646,107 B1
(45) Date of Patent: Feb. 4, 2014

(54) IMPLEMENTING USAGE LIMITED SYSTEMS

(75) Inventor: Joe Luther Hanson, Pleasanton, CA (US)

(73) Assignee: Altera Corporation, San Jose, CA (US)

( * ) Notice: Subject to any disclaimer, the term of this patent is extended or adjusted under 35 U.S.C. 154(b) by 1533 days.

(21) Appl. No.: 10/877,504

(22) Filed: Jun. 25, 2004

(51) Int. Cl.
*G06F 21/00* (2013.01)

(52) U.S. Cl.
USPC ........ 726/34; 726/4; 726/21; 726/26; 726/27; 380/201; 713/192; 705/56

(58) Field of Classification Search
USPC ................................ 726/34; 705/56; 713/192
See application file for complete search history.

(56) References Cited

U.S. PATENT DOCUMENTS

| | | | |
|---|---|---|---|
| 6,377,570 B1 * | 4/2002 | Vaziri et al. | 370/352 |
| 6,535,505 B1 * | 3/2003 | Hwang et al. | 370/352 |
| 6,580,683 B1 * | 6/2003 | Braitberg et al. | 369/275.3 |
| 6,584,108 B1 * | 6/2003 | Chung et al. | 370/401 |
| 6,697,948 B1 * | 2/2004 | Rabin et al. | 726/30 |
| 6,751,706 B2 * | 6/2004 | Chauvel et al. | 711/122 |
| 6,990,513 B2 * | 1/2006 | Belfiore et al. | 709/203 |
| 7,039,811 B2 * | 5/2006 | Ito | 713/185 |
| 7,080,043 B2 * | 7/2006 | Chase et al. | 705/59 |
| 7,155,415 B2 * | 12/2006 | Russell et al. | 705/59 |
| 7,266,202 B1 * | 9/2007 | Kawakami et al. | 380/283 |
| 7,383,205 B1 * | 6/2008 | Peinado et al. | 705/59 |
| 7,395,438 B2 * | 7/2008 | Parks et al. | 713/194 |
| 7,454,169 B2 * | 11/2008 | Soerensen et al. | 455/26.1 |
| 2002/0107802 A1 * | 8/2002 | Philips | 705/51 |
| 2003/0081746 A1 * | 5/2003 | Ahlstrom et al. | 379/102.06 |

OTHER PUBLICATIONS

Akella, Venkatesh. Gopalakrishnan, Ganesh. "Specification and Valdiation of Control-Intensive IC's in hopCP". IEEE Transactions on Software Engineering. Pub. Date: Jun. 1994. vol. 20, Issue: 6. Relevant pp. 405-423. Found on the World Wide Web at: http://ieeexplore.ieee.org/stamp/stamp.jsp?tp=arnumber=295890.*
Enomoto, Takashi; Sekine, Munenori; Chikara, Sakae; Kubota, Koji. A Freight Status Management System with Restriction to Record Loading/Unloading Information by Location. Proceedings IEEE Intelligent Transportation Systems. vol. 1 Pub. Date: 2003. Relevant pp. 548-553. Found at: http://ieeexplore.ieee.org/stamp/stamp.jsp?tp=&arnumber=1252013.*
Qnx Software Systems, http://www.qnx.com/, © 2004-2005, Jul. 18, 2005.
QNX Neutrino Realtime Operating System, http://www.qnx.com/products/rtos/, © 2004-2005, Jul. 18, 2005.
Free 30-day QNX Momentics Development Suite v6.3 commercial product evaluation, http://www/qnx.com/products/eval/index/html, © 2004-2005, Jul. 18, 2005.

* cited by examiner

*Primary Examiner* — Cordelia Zecher
*Assistant Examiner* — Jeremiah Avery
(74) *Attorney, Agent, or Firm* — Kwan & Olynick LLP

(57) ABSTRACT

Methods and apparatus are provided for implementing a system such as a programmable chip system having hardware and software usage limitations and restrictions. Usage limitation circuitry is integrated onto a device. A usage limitation function is integrated into software, such as an operating system for the device. The usage limitation function can be configured to interact with the usage limitation circuitry. The usage limitation circuitry and the usage limitation function are operable to disable the device and the associated software.

30 Claims, 9 Drawing Sheets

IMPLEMENTING USAGE LIMITED SYSTEMS

BACKGROUND OF THE INVENTION

1. Field of the Invention

The present invention relates to implementing usage limited systems. In one example, the present invention relates to methods and apparatus for efficiently implementing both hardware and software based usage limited systems.

2. Description of Related Art

Providers often develop versions of devices, software, and/or platforms that give a user varying levels of access, rights, restrictions, and privileges. For example, a provider may develop a version of device that allows a user to evaluate the device for a certain period of time. After the evaluation period expires, the device is either no longer usable or usable only in a more restricted form. In another example, a provider may develop a version of a software application that allows a user to view particular files but not modify the files. If the user agrees to a license, the user can then have access to additional uses of the software application.

However, both hardware and software usage restrictions have their limitations. In some instances, hardware usage restrictions are not easily modified and may not always apply to particular systems. Software usage restrictions are often prone to tampering.

Consequently, it is desirable to provide improved techniques and mechanisms for implementing usage limitations and restrictions.

SUMMARY OF THE INVENTION

Methods and apparatus are provided for implementing a system such as a programmable chip system having hardware and software usage limitations and restrictions. Usage limitation circuitry is integrated onto a device. A usage limitation function is integrated into software, such as an operating system for the device. The usage limitation function can be configured to interact with the usage limitation circuitry. The usage limitation circuitry and the usage limitation function are operable to disable the device and the associated software.

In one embodiment, a method for generating a usage limited programmable chip system is provided. Usage limit information identifying programmable chip system usage restrictions is provided. Usage limit circuitry is implemented on a programmable chip associated with the programmable chip system. The usage limit circuitry takes usage limit information and integrates usage restrictions onto the programmable chip. Usage limit code is integrated into software for using the programmable chip. The usage limit code takes usage limit information to integrate usage restrictions into software.

In another embodiment, a programmable chip system is provided. The programmable chip system includes memory, a processor, and a usage limit peripheral. A processor is coupled to memory on a programmable chip. The processor is configured to run under an operating system. The operating system includes usage limit code that provides usage limit restrictions for the operating system. The usage limit peripheral on the programmable chip is coupled to the processor and memory on the programmable chip.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Figure 1:
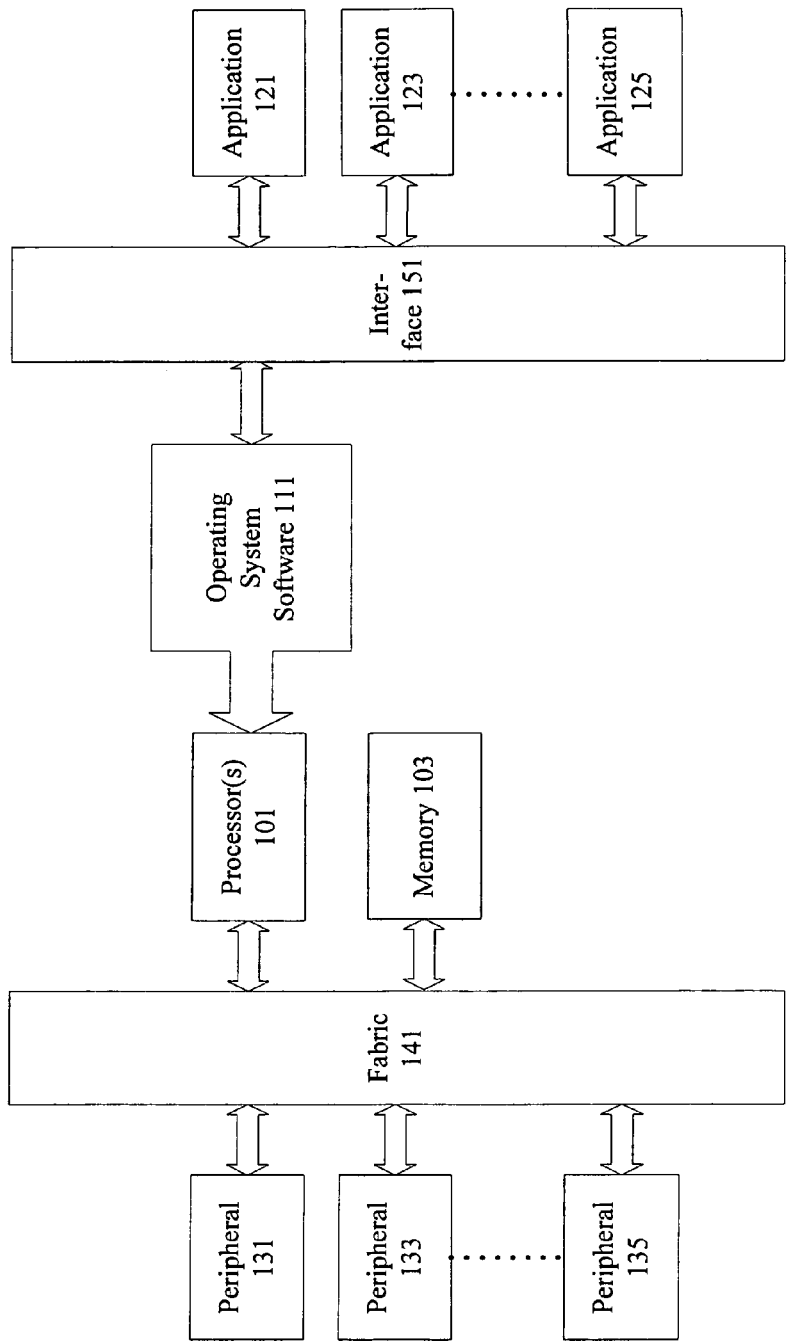
FIG. 1 is a diagrammatic representation of a programmable chip platform having integrated software and hardware usage limit functionality

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular processors and devices. However, it should be noted that the techniques of the present invention can be applied to a variety of types of processors and devices and associated software. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

A variety of mechanisms are available to allow users to evaluate a system such as a programmable chip system or platform. For example, a provider may implement a scaled-down version of a tool for evaluation by a user. Alternatively, the provider may give a full version of the development platform with usage limited to a particular period of time. A variety of restrictions are availability for varying the functionality of the device or tool. In one example, an application may be fully functional but may not allow a user to generate files. In another example, certain functionality may be disabled or enabled on the activation of particular license agreements. Software based usage limitations such as time limitations are often coded into particular tools and applications. When an application is run, the date and time and registry information associated with a particular system can be determined. Based on the date, time, and registry information, certain functionality can be enabled or disabled.

In one particular example, operating system vendors including real-time operating system vendors provide development tools for an evaluation period. In these cases, users can develop peripherals and peripheral drivers for a particular custom programmable chip system. However, the user does not typically have a license to ship an operating system developed during this period. Also, once the evaluation period expires, the user may have to purchase a full version of the tool to continue development. To decrease the likelihood of tampering, software applications include usage restrictions and are typically provided in binary form. However, by providing application only in binary form, customers can develop application code but cannot change or modify an operating system in any way.

Similar usage restrictions can also be provided in hardware. Circuitry restricting functionality or access to particular hardware components can be used to monitor system timestamps and clock cycle information to enable or disable certain features. For example, a system can disable a particular hardware accelerator after the processor has executed a certain number of clock cycles. Alternatively, a processor may operate only in test mode after a certain date has passed. Hardware usage restrictions are typically directly wired onto a device.

Both hardware usage restrictions and software usage restrictions offer benefits and drawbacks. Software usage restrictions are prone to tampering and hacking. Hardware usage restrictions are typically less susceptible to tampering. However, software usage restrictions are often typically easier to implement and also more flexible in implementation. For example, a variety of different restrictions can be implemented without physically rewiring a device. Furthermore, hardware usage restrictions may not always be applicable to software applications, as an application can be run on a variety of hardware systems.

According to various embodiments, a combined embedded system including both software and hardware elements are provided by a single entity. By providing embedded systems with both hardware and software to an end-user, more robust usage limit restrictions can be implemented. Consequently, techniques of the present invention provide mechanisms for using both hardware usage restrictions and software usage restrictions in a single system. The software usage restrictions can be reinforced with hardware usage restrictions. Alternatively, one set of usage restrictions may be derived from the other set of usage restrictions. By providing a single combined embedded system, combined usage restrictions can also be implemented. By using combined usage restrictions, a single license file outlining usage privileges and restrictions can be used to control both hardware and software functionality. A provider can also give a user access to operating system source code to allow a user to more effectively customize a system.

When a user develops a system on a programmable chip, a user typically creates a customized system on a development board. Users typically need to have a mechanism to build an operating system that allows use of the customized system associated with the programmable chip. However, a provider cannot allow unlimited development. By developing a generator tool that allows open development along with usage limited versions of operating systems associated with usage limited hardware, providers are able to more effectively provide evaluation versions with decreased risk of intellectual property loss. It should be noted that although the combined software and hardware usage restrictions are particularly applicable to programmable chip systems, they can be implemented on a variety of systems.

FIG. 1 is a diagrammatic representation showing an embedded system including both implemented hardware and software. According to various embodiments, a hardware portion of a programmable chip system includes a processor 101 coupled to a variety of peripherals 131, 133, and 135 through a fabric 141. Although only one processor is shown, it should be noted that multiple processors are supported. In one embodiment, the fabric 141 is a bus. In other examples, the fabric 141 is a simultaneous multiple master interconnection fabric that provides direct links between components such as processors and peripherals. It should be noted that various processors are also referred to herein as primary components or master components and various peripherals are also referred to herein as slave components or secondary components. Peripherals can include devices such as a Universal Asynchronous Receiver Transmitter (UART), a timer, a parallel input/output (PIO), or an Ethernet device. The processor 101 is also coupled to memory 103 optionally through the fabric 141. In other examples, a processor 101 can be directly connected to memory 103.

The programmable chip system can be configured by users to perform customized tasks and functions. In some examples, a development platform such as a system on a programmable chip builder (SOPC Builder) can be used to generate the primary and secondary components and the interconnection fabric. SOPC Builder is available from Altera Corporation of San Jose, Calif.

The system may also include hardware accelerators such as video accelerators, digital signal processors, cryptography accelerators, etc. Consequently, a programmable chip system is capable of implementing functions in both hardware and/or software through the processor 101. The processor 101 can be run using an operating system 111. The operating system 111 supports applications 121, 123, and 125. The applications 21, 123, and 125 are supported typically through an application program interface 151.

The programmable chip system includes both hardware and software components. Hardware and software components are implemented using some human readable description. The description can be text based, graphical, or symbolic or other. The descriptions can contain valuable algorithms, designs, or materials that are converted from human readable form into machine-readable form. The conversion process often uses computer applications such as SOPC Builder to perform this conversion. The conversion of the hardware description and the software description are typically separate processes.

For example, the conversion of the hardware may entail converting hardware descriptor language files into netlist and place and route files. The conversion of a software description may involve converting high-level programming language files into object files and finally to binary executables. In one example, the conversion of a schematic diagram of an electronic circuit, the synthesis of hardware description language files, or the conversion of a table of entries listing the blocks contained in the hardware section are part of the system generation process. The conversion of text files or a graphical description of state transitions or other forms of software entry depends on information entered in the hardware portion for operation.

Consequently, generating a system is a process of converting resources from the two separate processes while having information exchange dependencies. By including usage restrictions defined by licenses or other criteria, the system can be made to include the hardware circuits and/or software code that enable or disable aspects of system operation.

Figure 2:
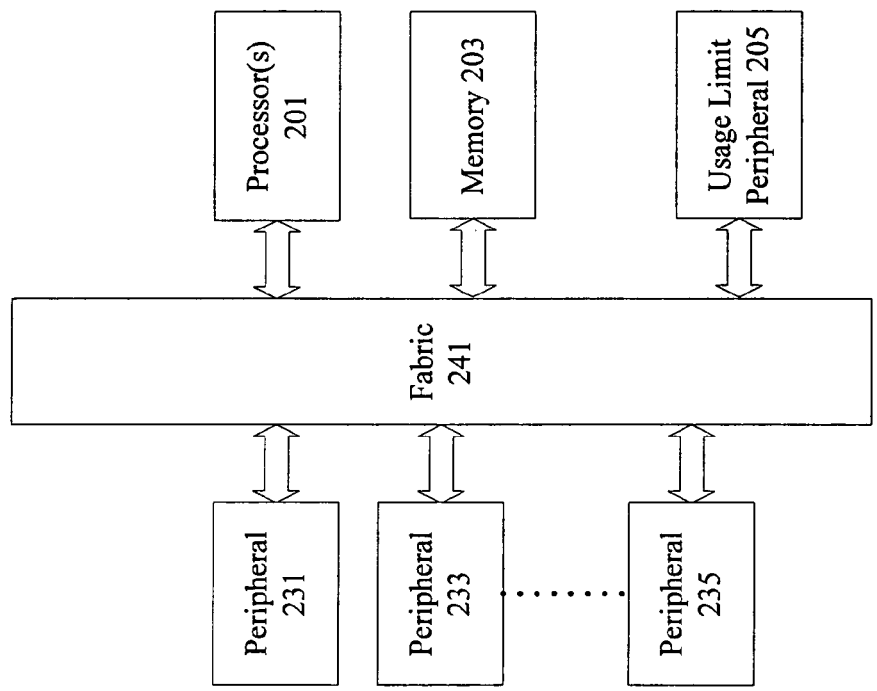
FIG. 2 is a diagrammatic representation showing usage limit circuitry integrated with an interconnection fabric.

FIG. 2 is a diagrammatic representation showing an embedded system including one example of a usage limit mechanism. According to various embodiments, the programmable chip system includes a processor 201 coupled to a variety of peripherals 231, 233, and 235 through a fabric 241. The processor 201 is also coupled to memory 203 optionally through the fabric 241. According to various embodiments, a usage limit peripheral 205 is also coupled to the interconnection fabric 241. The usage limit peripheral 205 can monitor clock cycle and/or time and date information to enable and disable system functionality. In one embodiment, the usage limit peripheral 205 disables the interconnection fabric 241 upon detecting that a particular date has arrived. In other examples, the usage limit peripheral 205 can disable selected components such as one or more processors and peripherals in the system. A system can be disabled in a variety of manners. According to various embodiments, the system can be disabled in any effective, but safe manner. In one example, a system is disabled by disabling the clocking mechanism for a processor or any other component. In another example, transactions can be disabled via a bus or interconnection fabric.

Figure 3:
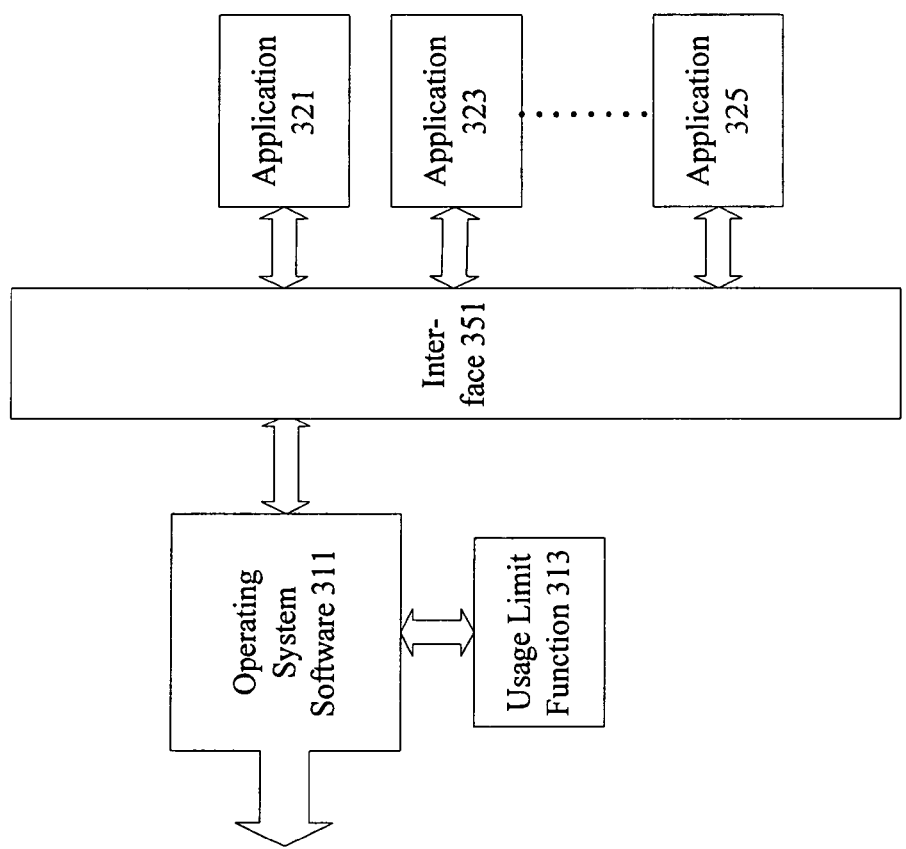
FIG. 3 is a diagrammatic representation showing usage limit code integrated in an operating system.

The usage limit peripheral 205 may or may not be integrated with software running on the programmable chip system. One example of a software platform running on the programmable chip system is shown in FIG. 3. FIG. 3 is a diagrammatic representation showing an operating system and supported applications running on the programmable device. According to various embodiments, operating system software 311 interacts with a processor on the programmable chip system. The usage limit function 313 can be integrated into the operating system software 311. In typical implementations, when the usage limit function 313 is integrated into operating system software 311, operating system software 311 is susceptible to tampering to remove the usage limit functionality 313. Consequently, operating system software 311 is commonly provided in executable only format to a user. However by providing only an executable to the user, operating system software 311 cannot easily be modified to suit particular user needs.

According to various embodiments of the present invention, techniques and mechanisms are provided to allow a user to receive an operating system in its source code format. To prevent tampering, the usage limit function 313 can be directly coupled to a usage limit peripheral. According to various embodiments, operating system software 311 will not operate unless the usage limit function 313 can continuously communicate with the usage limit peripheral on a programmable chip system.

In some examples, the operating system software 311 can be configured to periodically request a key from a usage limit peripheral on the programmable chip. The key is used to unlock portions of operating system code. In some examples, the key may be time specific to further discourage tampering. In other examples, the operating system includes an encrypted table having a number of codes as entries in the encrypted table. The usage limit peripheral is configured with the same set of codes. A usage limit peripheral can periodically request that the operating system send a particular decrypted code. The operating system obtains the appropriate decrypted code by using a license file provided key to decrypt a particular entry in the encrypted table. The decrypted code is then passed to the usage limit peripheral, which then compares the decrypted code from the operating system to a decrypted one in its own table. According to various embodiments, the usage limit peripheral maintains a decrypted code table. In other embodiments, the code table is encrypted, but accessed using a license file provided key.

In yet another embodiment, both a usage limit peripheral and usage limit code in an operating system are provided with individual keys. In one example, the usage limit peripheral has a private key and the usage limit code has the corresponding public key. The usage limit peripheral or the usage limit code can periodically initiate a verification sequence. For example, the usage limit peripheral can generate a pseudo-random number and send the pseudo-random number encrypted using its public key to the usage limit code. In order to operate properly, the usage limit code must decrypt the pseudo-random number using its corresponding public key and provide the decrypted pseudo-random number back to the usage limit peripheral. A variety of encryption and authentication techniques can be applied to verify that a usage limit function is properly communicating with a usage limit peripheral.

According to various embodiments, the usage limit function 313 is integrated into the kernel of the operating system software 311. The operating system software 311 provides an interface 351 to allow applications 321, 323, and 325 to interact with a programmable chip processor. According to various embodiments, software usage limitations are combined with hardware usage limitations in order to decrease the likelihood of tampering any programmable chip system. A programmable chip system in many instances is particularly suitable for implementing combined software and hardware usage limitations because a programmable chip system allows implementation of a device and associated software simultaneously.

Figure 4:
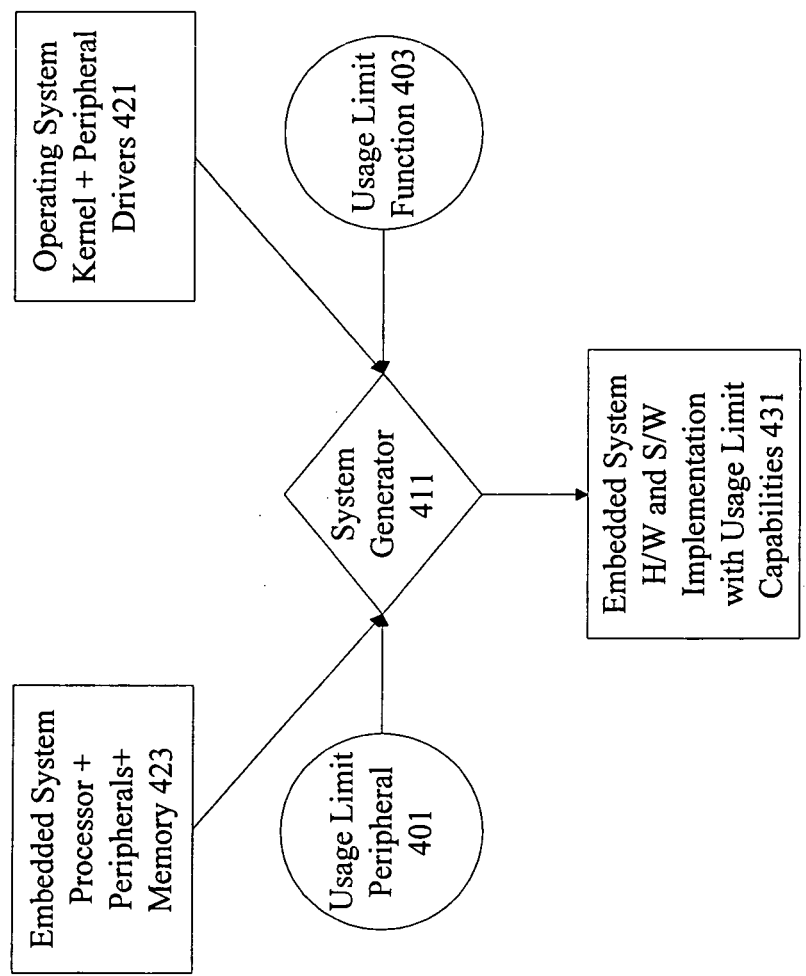
FIG. 4 is a diagrammatic representation showing a system generator.

FIG. 4 is a diagrammatic representation showing a system generator used to implement a programmable device. According to various embodiments, a system generator 411 receives an embedded system processor along with selected peripherals and memory 423. The system generator 411 also receives an operating system kernel with peripheral drivers 421.

An embedded system processor and peripherals may be selected by a user from a library and parameterized to suit particular needs. For example, a timer may be configured as a 4-bit timer instead of an 8-bit timer. The operating system kernel along with peripheral drivers 421 are selected based on the particular processors and peripherals selected. In some examples, the selection of peripherals dictates which drivers are loaded onto the system generator 411. The system generator 411 also receives usage limit peripheral information 401 and usage limit function information 403. According to various embodiments, both the usage limit peripheral 401 and the usage limit function 403 are configured using a license file defining particular rights, privileges, and restrictions for a particular user.

In some examples, usage limit peripheral 401 and usage limit function 403 are configured to stop system operation after 30 days. In another example, the license file allows a device to stop operating after one week while allowing continued development using software for another 30 days. In other examples, development of a system using a tool can continue for unlimited time, but each time a system is created without the appropriate license, the system is restricted to operate for only a limited period of time. For example, a programmable chip system can be developed in an unrestricted manner, and yet the IP providers are protected from unauthorized distribution of a working product. By using a unified license file, rights can be easily managed by a provider. The license file may also be used to provide a key to both the usage limit function and the usage limit peripheral. Any software mechanism used to limit access to system operation is referred to herein as a usage limit code. In one example, usage limit code is a usage limit function. Any hardware mechanism used to limit access to system operation is referred to herein as usage limit circuitry. In one example, usage limit circuitry is a usage limit peripheral.

A system generator can then create an embedded system with both a hardware and software implementation with usage limit capabilities 431. By providing both hardware and software usage limit capabilities, the risk of system tampering is reduced while allowing a provider to give a user more access to operating system code.

Figure 5:
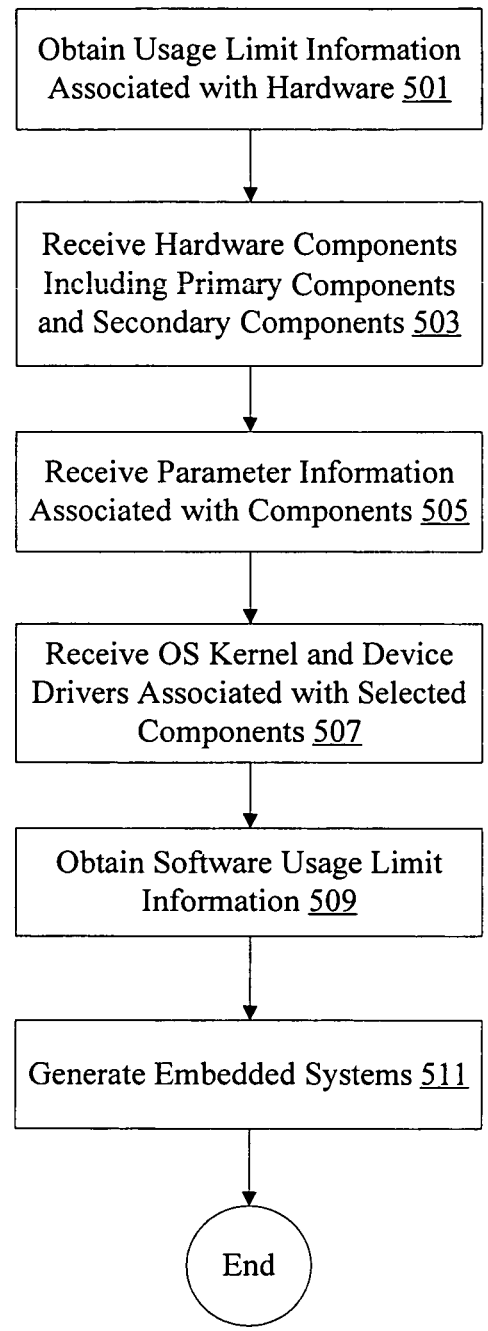
FIG. 5 is a flow process diagram showing a technique for implementing usage limit capabilities.

FIG. 5 is a flow process diagram showing one technique for implementing a programmable chip system. At 501, usage limit information associated with hardware is obtained. In some examples, the usage limit information is obtained from a license file. At 503, hardware components including primary components and secondary components are received. In some examples, parameter information associated with the primary and secondary components is received at 505. At 507, an operating system kernel and the device drivers associated with the selected and parameterized components are received. At 509, software usage limitation information is obtained. In some examples, the software usage limitation information is obtained from the same license file used by the hardware usage limit peripheral. At 511, the embedded system is generated.

Although the techniques and mechanisms of the present invention are applicable to a variety of different devices including general computer systems, mobile devices, etc., the techniques and mechanisms of the present invention are particularly applicable to programmable chip systems.

Figure 6:
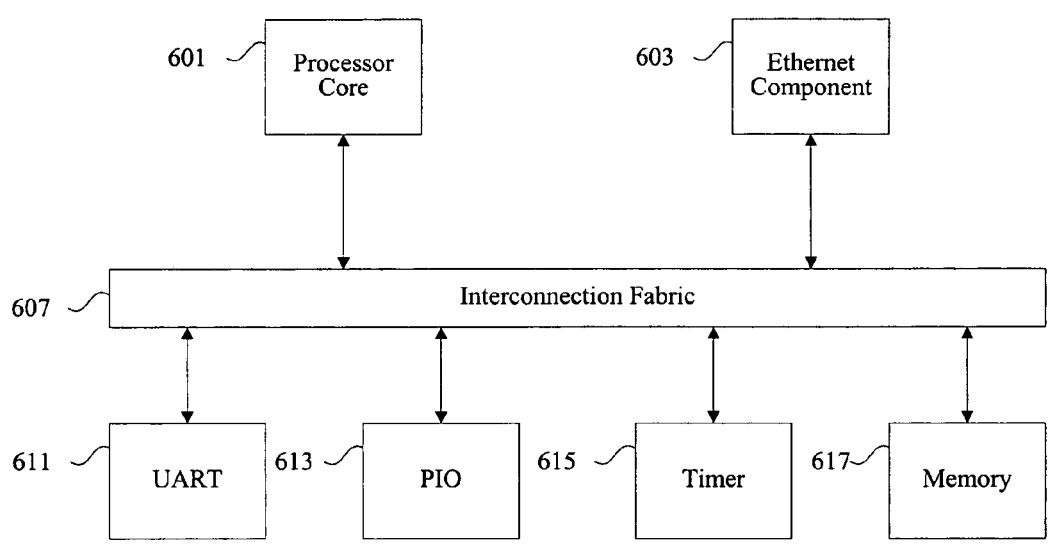
FIG. 6 is a diagrammatic representation showing a programmable chip system.

FIG. 6 is a diagrammatic representation showing one example of a system on a programmable chip that can be used to implement the techniques of the present invention. The system includes a processor core, a hardware accelerator, peripheral devices, and peripheral interfaces. Peripheral devices and peripheral interfaces are herein referred to as components. According to various embodiments, a usage peripheral is included as a component. The system on a programmable chip includes processor core 601 and an Ethernet component 603 as well as peripheral components UART 611, PIO 613, timer 615, and data memory 617. In some examples, the Ethernet component 103 is instead a Digital Signal Processing (DSP) core, a cryptography accelerator, or a video processor. It should be noted that the system can include both on-chip memory 617 and off-chip memory. In one example, the data memory 617 can support variable latency or fixed latency access. The components are interconnected using an interconnection fabric 607. Any mechanism or logic for connecting components in a system is referred to herein as an interconnection fabric. In one example, the interconnection fabric is a bus. In another example, the interconnection fabric is a secondary side arbitration fabric.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element.

Some logic elements are implemented as combinations of lookup tables, registers, and/or switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register. In other examples, a logic element is an adaptive logic module (ALM) that provides 8 inputs, allowing it to efficiently support various configurations such as 6-input or 7-input lookup tables or two independent 4-input lookup tables.

The techniques and mechanisms of the present invention allow the implementation of a system on a programmable chip from a high-level language program. In one example, variable latency and fixed latency can be supported on a system using a conventional bus architecture.

A system bus typically has a set width (e.g. 64 bits, 128 bits) and allows only one primary component to actively use the bus at any one time. In conventional systems, only one primary component can access any one of the given secondary components at any given time. Multiple primary components accessing secondary components in a manner that would cause data bit collisions if performed on the same data lines is referred to herein as accessing secondary components at the same time.

In one example, an Ethernet component is accessing a peripheral interface. While the Ethernet component is accessing the peripheral interface, a processor can not access an SDRAM through a peripheral interface even if both the peripheral interface and the SDRAM are available.

According to various embodiments of the present invention, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip or a programmable device. Instead of implementing complicated bus sharing schemes using mechanisms such as splitting, the bus itself can be eliminated to improve system performance.

According to specific embodiments, it is recognized that primary components and secondary components need not be routed through a construct such as a bus. By not routing signals through a bus, a streaming output device can be implemented in a much more efficient manner. The conventional data and address lines that make up the bus are no longer the resource in contention. Instead, secondary components are resources in contention, as the number of physical lines connected to each secondary component in a system can be fixed. Furthermore, by not using a bus, interconnection flexibility is enhanced. For example, an Ethernet component can be allocated a variety of ports for directly accessing a memory and the only resource in contention would be the memory.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a specific secondary component accessible by more than one primary component is referred to herein as a secondary side arbitrator. In one embodiment, there is a secondary side arbitrator for each secondary component in a computer system. In other embodiments, there is a secondary side arbitrator for selected secondary components in a system. The techniques of the present invention recognize that a programmable chip system is particularly efficient with secondary side arbitration. However, primary side arbitration or conventional bus techniques can be used as well.

Figure 7:
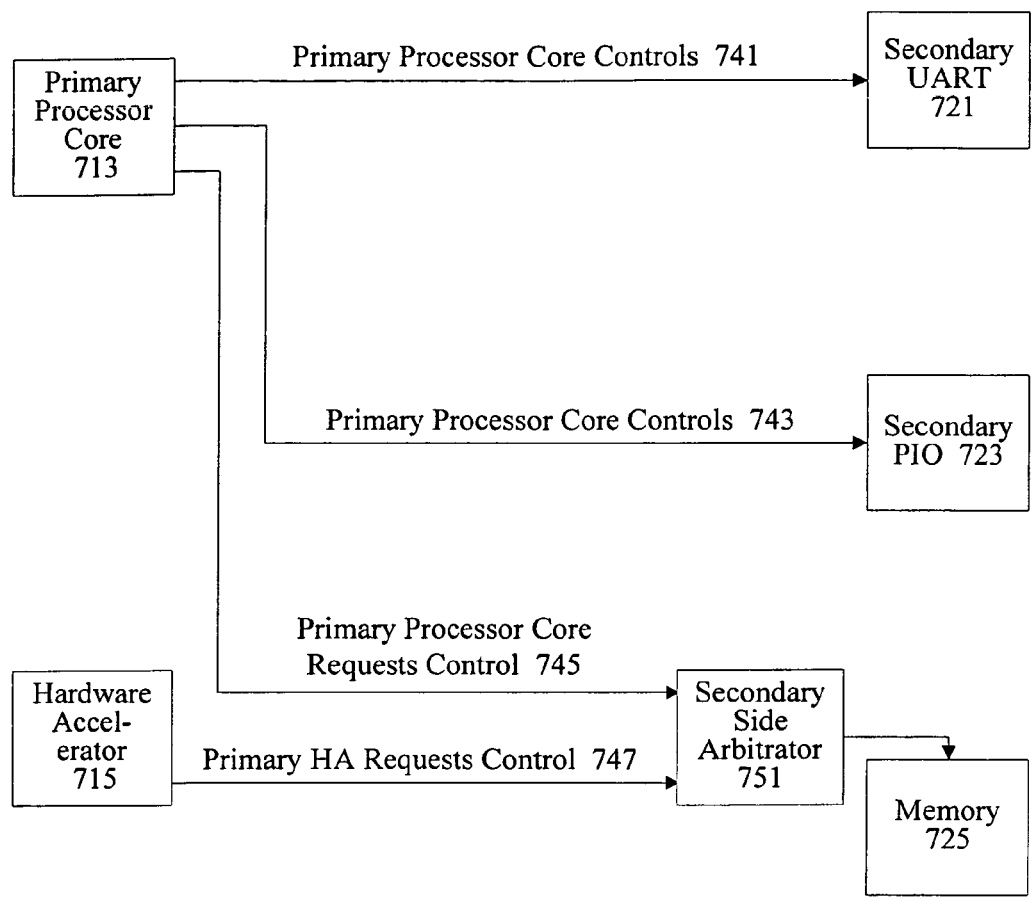
FIG. 7 is a diagrammatic representation showing an interconnection fabric.

FIG. 7 is a diagrammatic representation showing one example of a system using secondary side arbitration, sometimes referred to as slave side arbitration, simultaneous multiple primary components, a simultaneous primary component fabric, or simultaneous multiple masters. A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments, a secondary component such as memory 725 is associated with a secondary side arbitrator 751. However, secondary components UART 721 and PIO 723 are not associated with any arbitrator. In one example, secondary component UART 721 and secondary PIO 723 can only be accessed by primary CPU 713 and not by primary hardware accelerator 715. A secondary memory component 725, however, can be accessed by both primary CPU 713 and primary hardware accelerator 715.

According to various embodiments, a secondary side arbitrator 751 allows a first secondary component in a system to be accessed by a first primary component at the same time a second secondary component in the system is accessed by a second primary component. For example, memory 725 can be accessed by primary hardware accelerator 715 through secondary side arbitrator 751 at the same time, secondary UART 721 is accessed by primary CPU 713.

By allowing a CPU to access a secondary component at the same time another primary component such as a streaming output device or an Ethernet component is accessing memory, bus bottlenecks can be reduced. By using the simultaneous multiple primary component architecture, more direct connections between components can also be supported.

Figure 8:
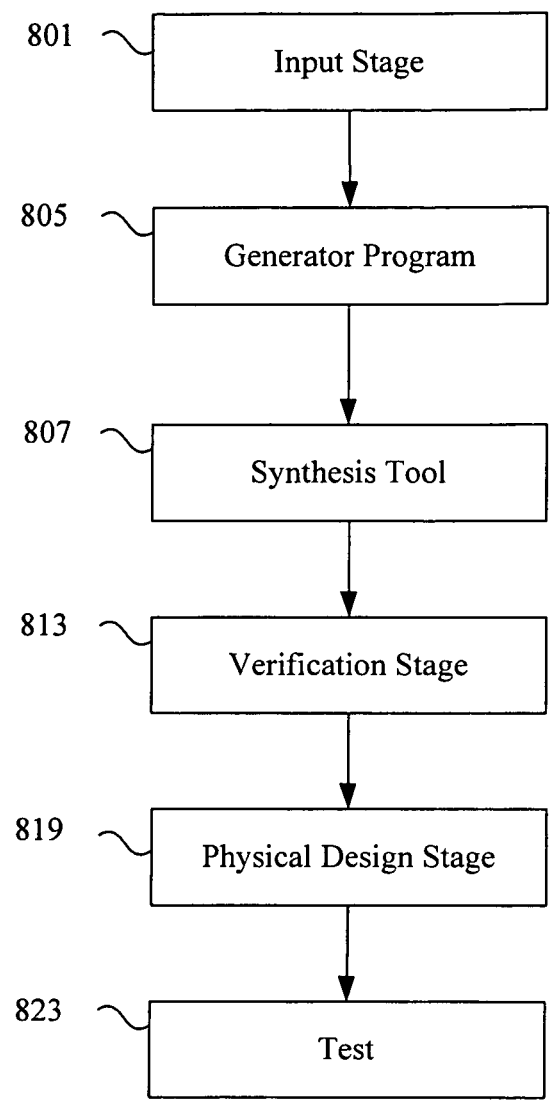
FIG. 8 is a diagrammatic representation showing a technique for implementing the programmable chip.

FIG. 8 is a diagrammatic representation showing implementation of a system on a programmable chip. An input stage 801 receives selection information typically from a user for logic such as a processor core as well as other components such as a streaming output device to be implemented on an electronic device. In one example, the input received is in the form of a high-level language program. A generator program 805 creates a logic description and provides the logic description along with other customized logic to any of a variety of synthesis tools, place and route programs, and logic configuration tools to allow a logic description to be implemented on an electronic device.

In one example, an input stage 801 often allows selection and parameterization of components to be used on an electronic device. The input stage 801 also allows configuration of variable or fixed latency support. In some examples, components provided to an input stage include intellectual property functions, megafunctions, and intellectual property cores. The input stage 801 may be a graphical user interface using wizards for allowing efficient or convenient entry of information. The input stage may also be a text interface or a program reading a data file such as a spreadsheet, database table, or schematic to acquire selection information. The input stage 801 produces an output containing information about the various modules selected.

In typical implementations, the generator program 805 can identify the selections and generate a logic description with information for implementing the various modules. The generator program 805 can be a Perl script or executable creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 805 identifies pointers and provides ports for each pointer. One tool with generator program capabilities is System on a Programmable Chip (SOPC) Builder available from Altera Corporation of San Jose, Calif. The generator program 805 also provides information to a synthesis tool 807 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 801, generator program 805, and synthesis tool 807 can be separate programs. The interface between the separate programs can be a database file, a log, or simply messages transmitted between the programs. For example, instead of writing a file to storage, the input stage 801 can send messages directly to the generator program 805 to allow the generator program to create a logic description. Similarly, the generator program can provide information directly to the synthesis tool instead of writing HDL files. Similarly, input stage 801, generator program 805, and synthesis tool 807 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 807.

A synthesis tool 807 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 813 typically follows the synthesis stage 807. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 813, the synthesized netlist file can be provided to physical design tools 819 including place and route and configuration tools. A place and route tool typically locates logic cells on specific logic elements of a target hardware device and connects wires between the inputs and outputs of the various logic elements in accordance with logic required to implement an electronic design. The device can also be physically tested at 823.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 801, the generator program 805, the synthesis tool 807, the verification tools 813, and physical design tools 819 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 9:
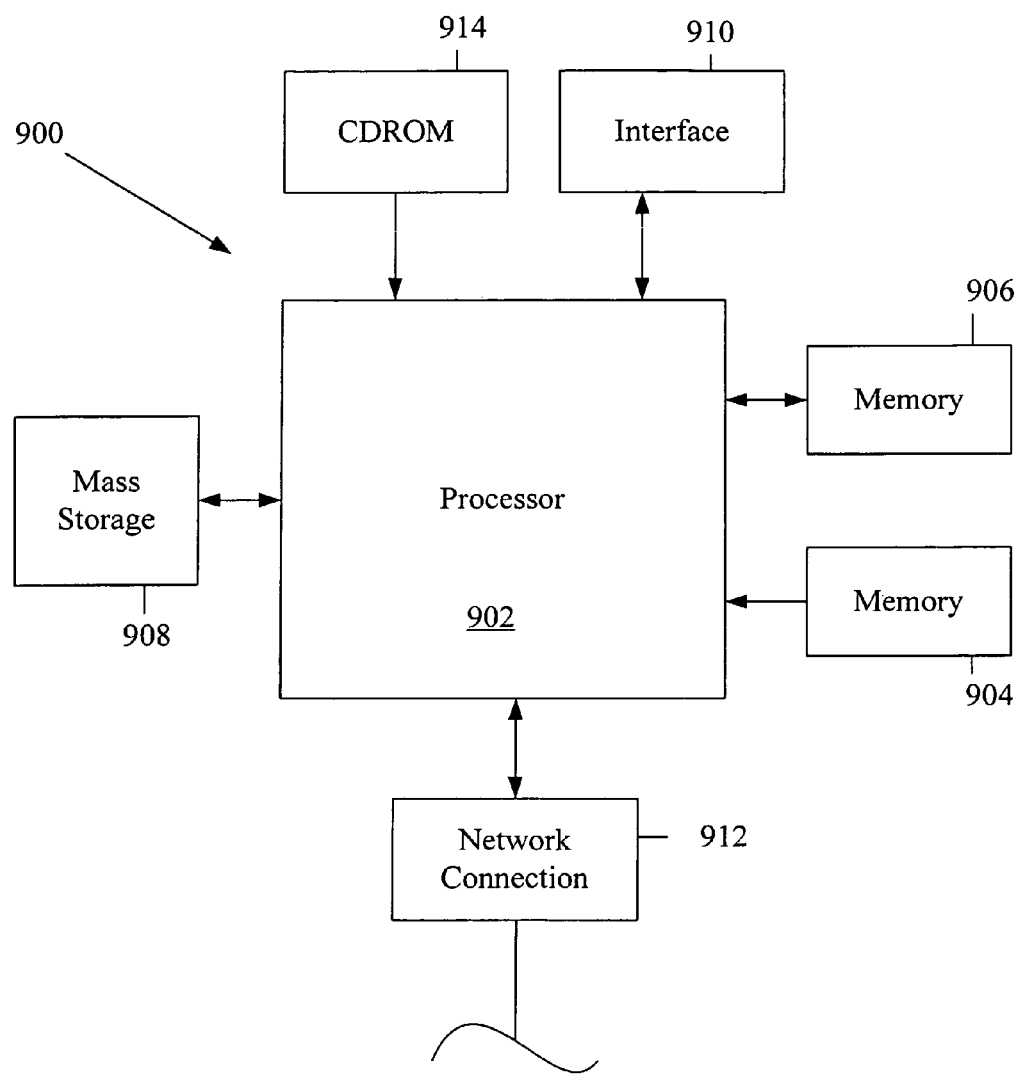
FIG. 9 is a diagrammatic representation depicting a computer system.

FIG. 9 illustrates a typical computer system that can be used to implement a programmable chip. The computer system 900 includes any number of processors 902 (also referred to as central processing units, or CPUs) that are coupled to devices including memory 906 (typically a random access memory, or "RAM"), memory 904 (typically a read only memory, or "ROM"). The processors 902 can be configured to generate test sequences for any designated processor. As is well known in the art, memory 904 acts to transfer data and instructions uni-directionally to the CPU and memory 906 is used typically to transfer data and instructions in a bi-directional manner.

Both of these memory devices may include any suitable type of the computer-readable media described above. A mass storage device 908 is also coupled bi-directionally to CPU 902 and provides additional data storage capacity and may include any of the computer-readable media described above. The mass storage device 908 may be used to store programs, data and the like and is typically a secondary storage medium such as a hard disk that is slower than memory. The mass storage device 908 can be used to hold a library or database of prepackaged logic or intellectual property functions, as well as information on generating particular configurations. It will be appreciated that the information retained within the mass storage device 908, may, in appropriate cases, be incorporated in standard fashion as part of memory 906 as virtual memory. A specific mass storage device such as a CD-ROM 914 may also pass data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally may be coupled to a computer or telecommunications network using a network connection as shown generally at 912. With such a network connection, it is contemplated that the CPU might receive information from the network, or might output information to the network in the course of performing the above-described method steps. It should be noted that the system 900 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 908 or 914 and executed on CPU 908 in conjunction with primary memory 906.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of processors and systems and should not be restricted to the ones mentioned above. It is therefore intended that the invention be interpreted to include all variations and equivalents that fall within the true spirit and scope of the present invention.

What is claimed is:

1. A method comprising:
    at a system generator tool, providing hardware usage restriction information;
    the system generator tool wiring a plurality of hardware components on one or more configurable hardware devices, the hardware components including restriction circuitry for restricting functionality or access to one or more of the hardware components; and
    the system generator tool coding a software usage restriction module into a software application of a processor,
    wherein the restriction circuitry is wired and the software usage restriction module is coded so that the restriction circuitry and the software usage restriction module cooperate together to restrict operation of the one or more hardware components based on the hardware usage restriction information.

2. The method of claim 1, wherein the hardware usage restriction information comprises a license file.

3. The method of claim 2, wherein the restriction circuitry is wired and the software usage restriction module is coded for restricting operation of an operating system of the processor unless the software usage restriction module is being accessed continuously by the restriction circuitry.

4. The method of claim 1, wherein the software usage restriction module is coded for:
periodically requesting a key from the restriction circuitry; and
unlocking a portion of an operating system software for the processor with the key.

5. The method of claim 1, wherein the software usage restriction module is coded for:
decrypting a table entry with a key associated with a license; and
sending the decrypted table entry as a decrypted code to the restriction circuitry.

6. The method of claim 5, wherein the restriction circuitry is wired for:
receiving the decrypted code; and
comparing the decrypted code with another decrypted code.

7. The method of claim 1, wherein the restriction circuitry is wired for:
generating a pseudo-random number;
encrypting the pseudo-random number with a key; and
sending the encrypted pseudo-random number to the software usage restriction module.

8. The method of claim 7, wherein the software usage restriction module is coded for:
receiving the encrypted pseudo-random number;
decrypting the encrypted pseudo-random number; and
sending the decrypted pseudo-random number to the restriction circuitry.

9. The method of claim 8, wherein the restriction circuitry is wired and the software usage restriction module is coded for verifying based on the pseudo-random number and the decrypted pseudo-random number whether the restriction circuitry is in communication with the software usage restriction module and to restrict use of the one or more hardware components based on such verification operation.

10. The method of claim 1, wherein the restriction circuitry is wired and the software usage restriction module is coded for disabling the operation of the one or more hardware components.

11. A development system, comprising:
a programmable chip having a plurality of configurable hardware elements;
a system generator tool configured to perform the following operations:
providing hardware usage restriction information,
configuring the hardware elements of the programmable chip into a plurality of hardware components, including restriction circuitry for restricting functionality or access to one or more of the hardware components based on the provided hardware usage restriction information, and
coding a software usage restriction module into a software application of a processor of the system, and wherein the restriction circuitry is wired and the software usage restriction module is coded so that the restriction circuitry and the software usage restriction module cooperate together to restrict operation of the one or more hardware components based on the hardware usage restriction information.

12. The system of claim 11, wherein the hardware usage restriction information comprises a license file.

13. The system of claim 12, further comprising the processor and a memory that are configured with an operating system, and wherein the restriction circuitry is wired and the software usage restriction module is coded to cooperate together to restrict operation of the operating system unless the software usage restriction module is being accessed continuously by the restriction circuitry.

14. The system of claim 13, wherein the system generator tool is configured to code the software usage restriction module for:
periodically requesting a key from the restriction circuitry; and
unlocking a portion of the operating system with the key.

15. The system of claim 11, wherein the system generator tool is configured to code the software usage restriction module for:
decrypting a table entry with a key associated with a license; and
sending the decrypted table entry as a decrypted code to the restriction circuitry.

16. The system of claim 15, wherein the system generator tool is configured to wire the restriction circuitry for:
receiving the decrypted code; and
comparing the decrypted code with another decrypted code.

17. The system of claim 11, wherein the system generator tool is configured to wire the restriction circuitry for:
generating a pseudo-random number
encrypting the pseudo-random number with a key; and
sending the encrypted pseudo-random number to the software usage restriction module.

18. The system of claim 17, wherein the system generator tool is configured to code the software usage restriction module for:
receiving the encrypted pseudo-random number;
decrypting the encrypted pseudo-random number; and
sending the decrypted pseudo-random number to the restriction circuitry.

19. The system of claim 18, wherein the system generator tool is configured to code the software usage restriction module and wire the restriction circuitry for verifying based on the pseudo-random number and the decrypted pseudo-random number whether the restriction circuitry is in communication with the software usage restriction module and to restrict use of the one or more hardware components based on such verification operation.

20. The system of claim 11, wherein the system generator tool is configured to code the software usage restriction module and wire the restriction circuitry for disabling the operation of the one or more hardware components.

21. A system comprising:
means for providing hardware usage restriction information;
means for wiring a plurality of hardware components on one or more configurable hardware devices, the hardware components including restriction circuitry for restricting functionality or access to one or more of the hardware components; and
means for coding a software usage restriction module into a software application of a processor,
wherein the restriction circuitry is wired and the software usage restriction module is coded so that the restriction circuitry and the software usage restriction module cooperate together to restrict operation of the one or more hardware components based on the hardware usage restriction information.

22. The system of claim 21, wherein the hardware usage restriction information comprises a license file.

23. The system of claim 22, wherein the restriction circuitry is wired and the software usage restriction module is coded for restricting operation of an operating system of the processor unless the software usage restriction module is being accessed continuously by the restriction circuitry.

24. The system of claim 21, wherein the software usage restriction module is coded for:
 periodically requesting a key from the restriction circuitry; and
 unlocking a portion of an operating system software with the key.

25. The system of claim 21, wherein the software usage restriction module is coded for:
 decrypting a table entry with a key associated with a license; and
 sending the decrypted table entry as a decrypted code to the restriction circuitry.

26. The system of claim 25, wherein the restriction circuitry is wired for:
 receiving the decrypted code; and
 comparing the decrypted code with another decrypted code.

27. The system of claim 21, wherein the restriction circuitry is wired for:
 generating a pseudo-random number;
 encrypting the pseudo-random number with a key; and
 sending the encrypted pseudo-random number to the software usage restriction module.

28. The system of claim 27, wherein the software usage restriction module is coded for:
 receiving the encrypted pseudo-random number;
 decrypting the encrypted pseudo-random number; and
 sending the decrypted pseudo-random number.

29. The system of claim 28, wherein the restriction circuitry is wired and the software usage restriction module coded for verifying based on the pseudo-random number and the decrypted pseudo-random number whether the restriction circuitry is in communication with the software usage restriction module and to restrict use of the one or more hardware components based on such verification operation.

30. The system of claim 21, wherein the system generator tool is configured to code the software usage restriction module and wire the restriction circuitry for disabling the operation of the one or more hardware components.

* * * * *